United States Patent Office 3,488,704
Patented Jan. 6, 1970

3,488,704
LUBRICITY AGENTS
William E. Lovett and John E. Englehart, Westfield, N.J., assignors to Esso Research and Engineering Company, a corporation of Delaware
No Drawing. Filed May 27, 1966, Ser. No. 553,322
Int. Cl. C10l 1/30
U.S. Cl. 44—58         5 Claims

ABSTRACT OF THE DISCLOSURE

A hydrocarbon fuel oil composition comprising a major proportion of a hydrocarbon fuel oil and a minor proportion of a polymer of a conjugated diolefin of from 4 to 5 carbon atoms, said composition having improved lubricating and antiwear properties.

---

This invention relates to lubricity agents for certain oleaginous compositions and to a method for operating rocket or jet engines or the like, of the class generally referred to as reaction engines, employing said lubricity agents. More particularly, this invention relates to a method for operating such engines under conditions exposing certain parts thereof to excessive friction and the resultant heat therefrom so that lubrication is required. The invention also relates to improved fuel compositions for use in said class of engines.

It has been found that in the operation of rockets, jet-type engines, and other similar devices, a substantial amount of undesirable wear results due to friction produced during cycling of the fuel employed. This frictional wear may be attributed to moving metal parts, e.g., pump parts, bearings, etc., which contact each other under high pressures and temperatures. The undesirable friction wear may also be attributed to the flow of the fuel per se through the conduit, pump, etc., means and also through the high temperature of the fuel utilized which results from frictional heat generated, e.g., friction resulting between the outer surface of the aircraft and the atmosphere. These contact, flow and high temperature factors have created special problems of undesirable frictional wear of various components, e.g., conduit, pumping, etc. means, utilized.

It is obvious that unless such surfaces are effectively continuously lubricated, rapid wear and early destruction occur. At the temperatures, pressures and other conditions which are normally encountered, particularly when operating at high speeds, high torques, etc., conditions arise under which ordinary lubricants are incapable of maintaining protective lubricating films. One method for effectively combatting such frictional wear is accomplished by incorporating a suitable lubricity agent into the fuel utilized. The thus-added lubricity agent accompanies the fuel on its circuitous path from its reservoir in the fuel tank to its ultimate combustion in the engine and coats and plates the conduit and cooperating means with thin layers of the lubricity agent. While a great number of lubricity agents have been employed in an effort to accomplish suitable coating and subsequent lubrication, there has yet to be found a lubricity agent which withstands the high temperatures generated over the pertinent areas by the pressure between moving parts, flow or fuel, and other rigors encountered in the cycling of the fuels. It is desirable, therefore, to provide a lubricity agent which produces an effective protective film of microscopic thickness which adheres tenaciously to the surfaces to be coated and prevents frictional wear, i.e., effectively lubricates those components subjected to frictional wear.

Accordingly, it is an object of the present invention to provide a method of operating a rocket or jet engine or the like in which a suitable lubricating effect is obtained by employing a lubricity agent contained in the fuel ultimately combusted.

It is another object of this invention to provide an improved fuel composition for rocket, jet engine or the like which contains a lubricating amount of a hydrocarbon lubricity agent which satisfactorily prevents friction wear, e.g., during the cycling of said fuel.

It is a further object of the present invention to provide a lubricity agent which may be suitably added to a fuel finding utility in a rocket, jet engine and the like and which, advantageously, prevents frictional wear during the cycling of said fuel.

These and other objects are attained by incorporating certain polymers of $C_4$ or $C_5$ conjugated diolefins, preferably butadiene, particularly butadiene polymers having a high proportion of cis-1,4-groups into a fuel composition to be utilized, whereby said diolefinic polymers effectively coat or plate the surfaces subjected to the rigors of excessive friction so as to prevent the undesirable wear resulting therefrom. It is obvious from the following description that the diolefin polymers of this invention may also find utility as lubricity agents in compositions other than the fuels referred to above. It is, accordingly, also contemplated by the present invention to use the specific diolefin polymers defined herein as lubricity agents in oleaginous compositions in general, e.g., as a lubricity agent, i.e., anti-wear agent, in lube oils, etc.

The particular polymers of $C_4$ or $C_5$ conjugated diolefins which are suitably employed as lubricity agents by the present invention are those that predominate in a 1,4 addition configuration and in which the 1,2 addition configuration does not exceed 10 percent. The polymers used in this invention have number average molecular weights in the range of from about 75,000 to about 300,000. Particularly preferable for use in this invention are polymers of the type described that have molecular weights in the range of from about 150,000 to about 250,000. The polymers are formed from conjugated diolefins having 4 to 5 carbon atoms and no more than one methyl side chain. While butadiene is preferred, isoprene and 1,3-pentadiene may also be used, as well as copolymers of any of these diolefins.

The different polymer characterizations in the case of butadiene are as follows:

1,2-polybutadiene:

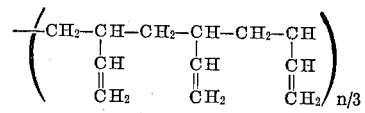

cis-1,4-polybutadiene:

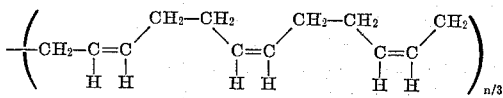

trans-1,4-polybutadiene:

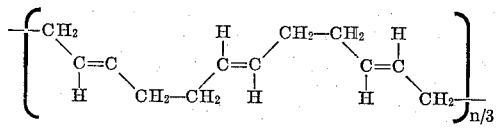

wherein in each instance $n$ is the number of butadiene units in the polymer.

Where the configuration is predominantly cis-1,4 that is, when the polymer contains about 80 to 100 percent of said configuration the polymer has the greatest lubricating potency.

The polymerization processes for the preparation of conjugated diolefins to high molecular weight polymers which are suitable for use in the present invention, e.g., in which the mode of polymerization is predominantly of a 1,4 configuration, are well-known in the art. The catalysts for such polymerization may comprise metallic lithium or lithium alkyls such as ethyl lithium, n-butyl lithium, hexyl lithium, or the like. They may also comprise lithium dihydrocarbon amides. Complexes of titanium tetrachloride and aluminum trialkyls, e.g., aluminum triisobutyl, may also be used.

The polymerization reaction is conveniently conducted in a solution using a nonpolar, nonacidic organic solvent, as for example, $C_3$ to $C_{16}$ straight chain, branched or cyclic paraffin hydrocarbon. Polymerization temperatures may range from about 0 to about 150° C., preferably from about 5 to 40° C. Pressures usually range from about 14.7 p.s.i.a. to 200 p.s.i.a. and preferably are maintained in the range of from about 14.7 p.s.i.a. to 60 p.s.i.a. Prior to polymerization the solvent and diolefins must be dried, as for example, by treatment with silica gel, alumina, or the like followed by distillation from sodium.

When the polymeric compositions of the present invention are added to the oleaginous base stocks, e.g., hydrocarbon fuels and the like they may be advantageously employed in concentrations as small as about 0.001 and up to about 3 weight percent in said oleaginous base stocks. More generally they will be used in concentrations ranging from about 0.01 to about 1 weight percent based on total weight of oleaginous base stocks. Conveniently they may be dissolved in 10 to 20 weight percent concentration in a solvent refined neutral mineral oil of about 100 or 150 SUS viscosity for ease in blending to the desired concentration in the final oleaginous, e.g., fuel formulation. The preparation of the concentrate simply involves comminuting the polymer and stirring it into the oil at a suitable temperature, e.g., 140 to 180° F., for a sufficient time to effect complete solution.

The present invention further contemplates that the diolefin polymers defined herein may be used not only as the sole component in an oleaginous composition, but also in conjunction with conventional additaments. These include: polyisobutylene; copolymers of vinyl acetate, maleic anhydride and aliphatic alcohol fumarates; alkyl methacrylates; copolymers containing alkyl methacrylates and copolymers containing alkyl fumarates; and the like. Particularly useful are combinations of the polybutadienes of the present invention in concentrations ranging from about 0.1 to about 1 weight percent with polyisobutylenes having number-average molecular weights in the range of from about 40,000 to about 160,000, using concentrations of the latter of from about 0.5 to about 1.5 weight percent.

Conventional additives including anti-oxidants, extreme pressure additives, anti-wear additives, pour point depressants, detergents and dispersant, etc., may also be present in the oleaginous compositions of this invention.

The oleaginous base stocks may comprise synthetic hydrocarbons as well as the usual hydrocarbon rocket fuels, jet fuels, lubricating oils, etc. derived from paraffins, kerosenes, naphthenes, asphaltic or mixed base crude oils by suitable refining methods, and the like.

The hydrocarbon fuel oils with which this invention is particularly concerned broadly comprise petroleum distillates that are commonly employed in various burner systems, as fuels for diesel engines, as jet fuels and as domestic or industrial heating oils. Such fuel oils may be generally characterized as those that consist of a major proportion of hydrocarbons boiling in the range of from about 350° F. to about 900° F.

Also contemplated is dicyclopentadiene, which decomposes at temperatures of 130°–150° C. Conjugated diolefins constitute a class of fuels for reaction motors. Other substances applicable to the present invention include methyl dicyclopentadiene, dimethyldicyclopentadiene, and homologs thereof, as well as butadiene dimer, butadiene-isoprene codimer, etc.

The following examples serve to illustrate this invention.

EXAMPLE 1

As mentioned, it is important that the conjugated diolefin polymers employed herein predominate in cis-1,4 addition configuration, e.g., it is preferred that they have greater than 80% cis-1,4 configuration. Accordingly, the method of preparing suitable polymeric products for use in the present invention is critical in that it must produce a polymeric product having the necessary addition configuration.

A suitable polymer can be prepared in the following manner wherein 300 ml. of petroleum ether (saturated with water) is cooled to a temperature of 0° C. Eight ml. of titanium tetrachloride is then added to the cooled petroleum ether. Thereafter, 50 ml. of n-heptane and 12 grams of a lithium dispersion (35% dispersion in petrolatum) are added to the petroleum ether-titanium tetrachloride mixture and the mass is agitated for about 1 hour. The resulting catalytic reaction product is then transferred to a storage vessel which has previously been flushed with helium.

Polymerization of a suitable polymer includes the steps of introducing 450 grams of petroleum ether into a polymerization vessel which has been flushed with helium at the same time 150 grams of butadiene and 4 ml. of the catalytic reaction product as prepared above are introduced. The reaction vessel is flushed with helium and sealed. The vessel is then suitably heated, e.g., by means of a constant temperature bath, to a temperature 50°–55° for a period of about 24 hours with suitable agitation means being provided.

Infrared examinations of the resulting product generally indicate that the polymer contains greater than 90% cis-1,4-; about 2% trans-1,4-; and about 0% 1,2-; the total unsaturation generally being greater than 90%.

EXAMPLE 2

This example illustrates that polymers of butadiene which have a high proportion of cis-1,4-groups are ideal as lubricity agents to prevent pump wear during cycling of aircraft jet fuels.

In this example, a blend of 0.1 weight percent of cis-1,4 polybutadiene is introduced into a fuel having the following specifications and the resulting mixture is introduced into a Ryder Gear Rig so as to evaluate the value of cis-1,4-polybutadiene as a lubricity agent in jet aviation fuels.

The cis-1,4-polybutadiene utilized had the following properties: 93–95% cis - 1,4 - polybutadiene with small amounts of trans - 1,4 - polybutadiene and 1,2 - polybutadiene; Mooney viscosity 45; and molecular weight ~240,000.

The fuel utilized had the following specifications:

| Property: | ASTM type A–1 spec. |
|---|---|
| Flash point, ° F. | 100–150 |
| Specific gravity | 0.775–0.830 |
| 10% evaporated, ° F. | max 400 |
| 50% evaporated, ° F. | max 450 |
| FBP evaporated, ° F. | max 550 |
| Polynuclear aromatics, vol. percent | max 3 |
| Aromatics, vol. percent | max 20 |
| Freezing pt., ° F. | −58 |
| Kinematic vis., at −30° F., cs. | max 15 |
| Sulfur, weight percent | max 0.3 |
| Heat of combustion (net), B.t.u./lb. | min 18,400 |

The test utilizing the Ryder Gear Erdco Universal Tester or equivalent, is fully described in ASTM D–1947–64.

In the method described therein, the oil under test is evaluated in a Standard Gear Machine at a series of increasing loads, under controlled conditions. The amount of tooth-faced scuffing occurring at each load increment is measured. The percentage tooth face scuffing is plotted against the load to determine the load-carrying capacity of the test oil.

The load-carrying capacity of the test oil is defined as the tooth load, in pounds per square inch of tooth face width, at which an average tooth face scuffing of 22.5% has been reached.

The tester comprises a special test machine known as the Ryder Gear Machine, a drive system, a support and load oil system, a test oil system, and the necessary instrument controls.

The data resulting from the above-described test is presented in Table I.

TABLE I

Load Pressure For 22.5% Scuff = 9.70
Average Tooth Width = .255

| Esso Turbofuel A–1 With 0.1 Wt. % Cis-1,4-Polybutane | Esso Turbofuel Base Fuel |
|---|---|
| $\frac{9.70 \times 18.55}{.255} = 706$ lb./inch | 350–500 lb./inch range |

As shown in Table I, the increase in load pressure from 350–500 lb./in. range to 706 lb./in. (an increase of 140–200%) required to produce a standard 22.5% scuff indicates that the cis-1,4-polybutadiene is an efficient and valuable lubricity agent for aviation jet fuels.

What is claimed is:

1. A hydrocarbon fuel oil composition comprising a major proportion of a hydrocarbon fuel oil selected from the group consisting of jet fuel oils, diesel fuel oils, heating fuel oils and combinations thereof and from about 0.001 to about 3 weight percent of a polymer of a conjugated diolefin of from 4 to 5 carbon atoms, said polymer having a number-average molecular weight in the range of from 75,000 to 300,000 and having at least 90% cis-1,4 configuration.

2. The composition of claim 1 wherein said polymer is a polymer of butadiene.

3. A process for operating a reaction engine utilizing a jet fuel oil, comprising the steps of passing in a lubricating relationship to a surface of a jet fuel oil composition comprising a major proportion of a jet fuel oil and from about 0.001 to about 3 weight percent of a polymer of a conjugated diolefin of from 4 to 5 carbon atoms, said polymer having a number-average molecular weight in the range of from 75,000 to 300,000 and having at least 90% cis-1,4 configuration and subsequently combusting said jet fuel oil.

4. The process of claim 3 wherein said polymer is a polymer of butadiene.

5. The composition of claim 1 wherein said hydrocarbon fuel oil is jet fuel oil.

References Cited

UNITED STATES PATENTS 3,312,621   4/1967   Brownawell et al. _ _ _ _ 252—59

DANIEL E. WYMAN, Primary Examiner

Y. H. SMITH, Assistant Examiner

U.S. Cl. X.R.

44—62